United States Patent

Stanuch et al.

[11] Patent Number: 5,097,397
[45] Date of Patent: Mar. 17, 1992

[54] NON-LINEAR SIGNALLING DEVICE FOR VEHICLES

[75] Inventors: Edward S. Stanuch, Oak Forest; Michael Benner, Lisle, both of Ill.; Earl Gosswiller, Pompono Beach, Fla.

[73] Assignee: Federal Signal Corporation, Oak Brook, Ill.

[21] Appl. No.: 592,587

[22] Filed: Oct. 4, 1990

[51] Int. Cl.$^5$ .............................................. B60Q 1/00
[52] U.S. Cl. ..................... 362/74; 362/238; 362/240; 362/249; 362/252; 362/284; 362/324; 340/472; D10/141; D26/35
[58] Field of Search ............... 362/35, 61, 66, 80, 362/234, 238, 240, 249, 252, 324, 368, 284, 74; 340/472, 471; D26/35; D10/114

[56] References Cited

U.S. PATENT DOCUMENTS

| D. 249,250 | 9/1978 | Peirish, Jr. ............... D10/114 |
| 2,814,029 | 11/1957 | McRea ..................... D10/114 |
| 3,278,741 | 10/1966 | Wood ....................... 340/472 X |
| 4,357,595 | 11/1982 | Gosswiller ................ 340/472 X |
| 4,521,835 | 6/1985 | Meggs et al. .............. 362/183 |

OTHER PUBLICATIONS

Color photograph of a Hush XL Custom Pumper (Half Door) manufacture by Emergency One, Inc., Ocala, Fla., no date given.
Color photograph of a 50' Teleboom manufactured by Emergency One, Inc., Ocala, Fla., no date given.
Color photograph of a 80' Aerial Ladder w/Pump manufactured by Emergency One, Inc., Ocala, Fla., no date given.

*Primary Examiner*—Stephen F. Husar
*Attorney, Agent, or Firm*—Leydig, Voit & Mayer

[57] ABSTRACT

A light bar is provided for mounting to a roof of an emergency vehicle such that the signalling devices comprising the light bar are distributed across the roof to form a non-linear pattern. A dome assembly covers the signalling devices and also forms a non-linear pattern traversing the roof. The light bar provides for enhanced visibility at angles approaching 90° to the heading of the vehicle. Moreover, the non-linear pattern of the signalling devices allows the light bar to provide a signalling pattern whose warning effect can be alternatively directionalized into different distinct zones about the vehicle. In a preferred embodiment, each of the signalling devices is contained in a module comprising a base and a dome such that enhanced transmittance of light is provided at angles approaching 90° from the heading of the vehicle.

44 Claims, 11 Drawing Sheets

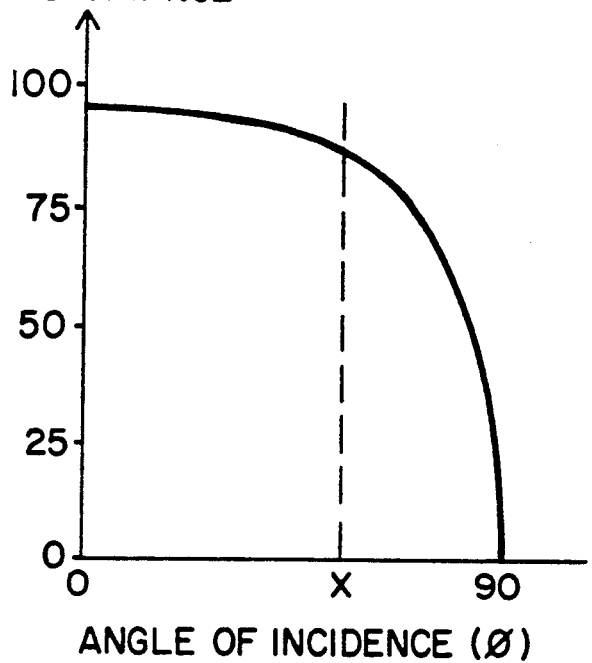
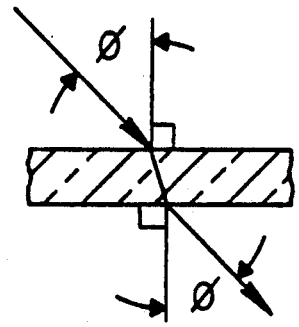
FIG. 4a
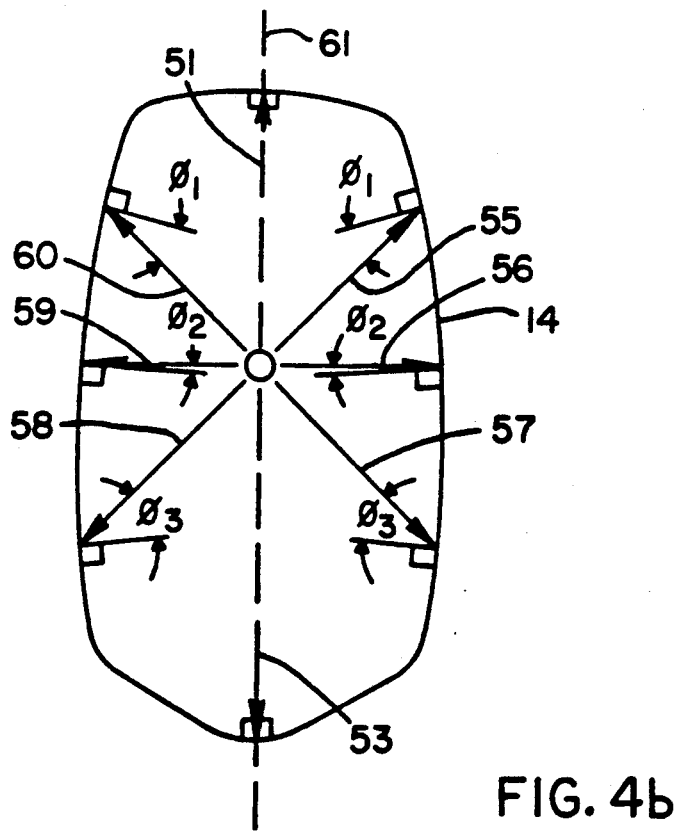
FIG. 4b

NON-LINEAR SIGNALLING DEVICE FOR VEHICLES

TECHNICAL FIELD

The invention is generally directed to signalling systems for emergency vehicles and more particularly, is directed to warning light assemblies for mounting to emergency vehicles.

BACKGROUND

Although warning light assemblies for emergency vehicles are used in many types of situations, one of the most common uses is to provide an effective warning for the vehicles as they approach traffic intersections. Despite the use of warning light assemblies in this situation, often accompanied by the use of sirens, collisions at intersections remain a serious problem for emergency vehicles.

With the increasing popularity of air conditioning and stereo systems in vehicles, sirens are often not heard. The sound of conditioned air through the ducting of a vehicle coupled with a loud stereo often means that an emergency vehicle is not identified until its warning lights are noticed. As air conditioning and audio systems in vehicles proliferate, it is important to maximize the ability of warning lights for emergency vehicles to warn other vehicles of their approach, particularly at intersections.

Traditionally, warning light assemblies for an emergency vehicle have been mounted on a base that traverses a roof of the vehicle. The warning lights are distributed substantially in a row across the roof and are enclosed by one or more transparent domes that protect the lights from the elements of the ambient environment. To draw attention to the lights, their intensities are varied, usually either by flashing them or focusing the lights into beams that rotate.

The visual effect of these flashing and/or rotating warning lights is greatest when viewed from directly in front or behind the vehicle. At intersections, however, the greatest danger of collision is derived from approaching vehicles in a crossing street or highway. These vehicles view the row of warning lights on the emergency vehicle at angles up to approximately 90° to the heading of the emergency vehicle. At such angles, the profile of the lights is effectively narrowed, thereby reducing their visibility. Furthermore, the domes over the warning lights are often configured such that their transmittance at angles approaching 90° is significantly less than when the warning lights are viewed from directly in front of or behind the vehicle. The combination of the reduced profile and transmittance seriously compromises the warning ability of the lights for vehicles approaching the emergency vehicle from a side angle, as is typically in an intersection.

SUMMARY OF THE INVENTION

It is a primary object of the invention to provide a light bar for an emergency vehicle having enhanced transmittance in directions at an angle to the heading of a vehicle carrying the light bar, while providing the same or better transmittance as conventional light bars along the heading of the vehicle. In this connection, it is a more particular object of the invention to provide a light bar for an emergency vehicle having increased visibility as the vehicle enters an intersection.

It is another object of the invention to provide a light bar for an emergency vehicle that is able to directionalize its warning pattern into zones positioned about the vehicle.

It is a further object of the invention to provide a light bar for an emergency vehicle that has the foregoing characteristics and is easily assembled and serviced. In this connection, it is a more particular object of the invention to provide a modular design for such a light bar.

It is a further object of the invention to provide a light bar that has the foregoing characteristics and is also aerodynamically efficient.

It is a further object of the invention to provide the foregoing light bar with a stable mounting that does not require the drilling of holes in the roof of the vehicle.

Other objects and features of the present invention will become apparent to those skilled in the art upon reading the following detailed description and upon reference to the drawings.

In order to achieve the foregoing objects and others, the invention provides a light bar comprising a plurality of like signalling devices distributed on a frame that traverses a roof of a vehicle, where the signalling devices are protected by a dome assembly that forms a nonlinear pattern. The non-linear pattern of the dome assembly enhances the visibility of the warning pattern generated by the signalling devices when viewed at an angle with respect to the heading of the vehicle carrying the light bar. Moreover, the non-linear pattern facilitates directionalizing the warning pattern into zones about the vehicle so that the visual effect of a warning pattern can be enhanced when viewed on one side of the vehicle with respect to the visual effect from the vehicle's other side.

Preferably, each of the signalling devices of the light bar is housed in a pod-like module mounted to the frame. The modules are similarly shaped and distributed along the frame to form a non-linear pattern when viewed from one end of the frame to the other. In the illustrated embodiment, the non-linear pattern is a V-shaped pattern. It will be appreciated from the following detailed description, however, that other non-linear patterns may also be implemented. The important factor in choosing a non-linear pattern is its ability to enhance the visibility of the warning pattern at angles approaching 90° to the heading of the vehicle while maintaining the same or better visibility along the heading of the vehicle as is provided by conventional linear light bars.

Each of the modules comprises a base section for supporting one of the signalling devices. A dome fits over the base and combines with it to isolate the signalling device from the elements of the ambient environment. Each of the domes surrounds the associated signalling device so that light emanating from the device is incident on the inner surface of the dome at an angle that remains close to 90 degrees. By maintaining such a relationship between the radiated light and the dome, the modules provide a high percentage transmittance of light in every direction, thereby further enhancing the visibility of the warning pattern when viewed at an angle to the heading of the vehicle.

As an alternative to the modular construction of the preferred embodiment, the dome assembly for the signalling devices may extend along the frame to cover more than one device. Although such a construction does not benefit as much from enhanced transmittance in all directions as does a modular construction, it may nevertheless still provide enhanced transmittance at angles to the heading of the vehicle relative to conventional linear light bars.

Preferably, each of the signalling devices comprises a reflector mounted to rotate about its focal point and a lamp positioned at the focal point. It will be appreciated, however, that many other types of visual signalling devices can be substituted for the preferred one and the advantages of the invention will still be realized.

BRIEF DESCRIPTION OF THE DRAWINGS

FIG. 4a is an exemplary graph, using the Cartesian coordinate system, illustrating variable transmittance of light from a lamp through a transparent medium such as a dome of a light bar for different angles of incidence, where the ordinate is the angle of incidence of the light in degrees and the abscissa is the amount of transmittance as a percentage of the incident light;

FIG. 4b is a schematic diagram illustrating the angles of incidence on the dome of one of the modules for light radiating from a lamp within the dome;

While the invention will be described in connection with a preferred embodiment and an alternative embodiment, there is no intention to limit it to those embodiments. On the contrary, the intent is to cover all alternatives, modifications, and equivalents falling within the spirit and scope of the invention as defined by the appended claims.

DETAILED DESCRIPTION OF THE PREFERRED EMBODIMENT

Figure 1:
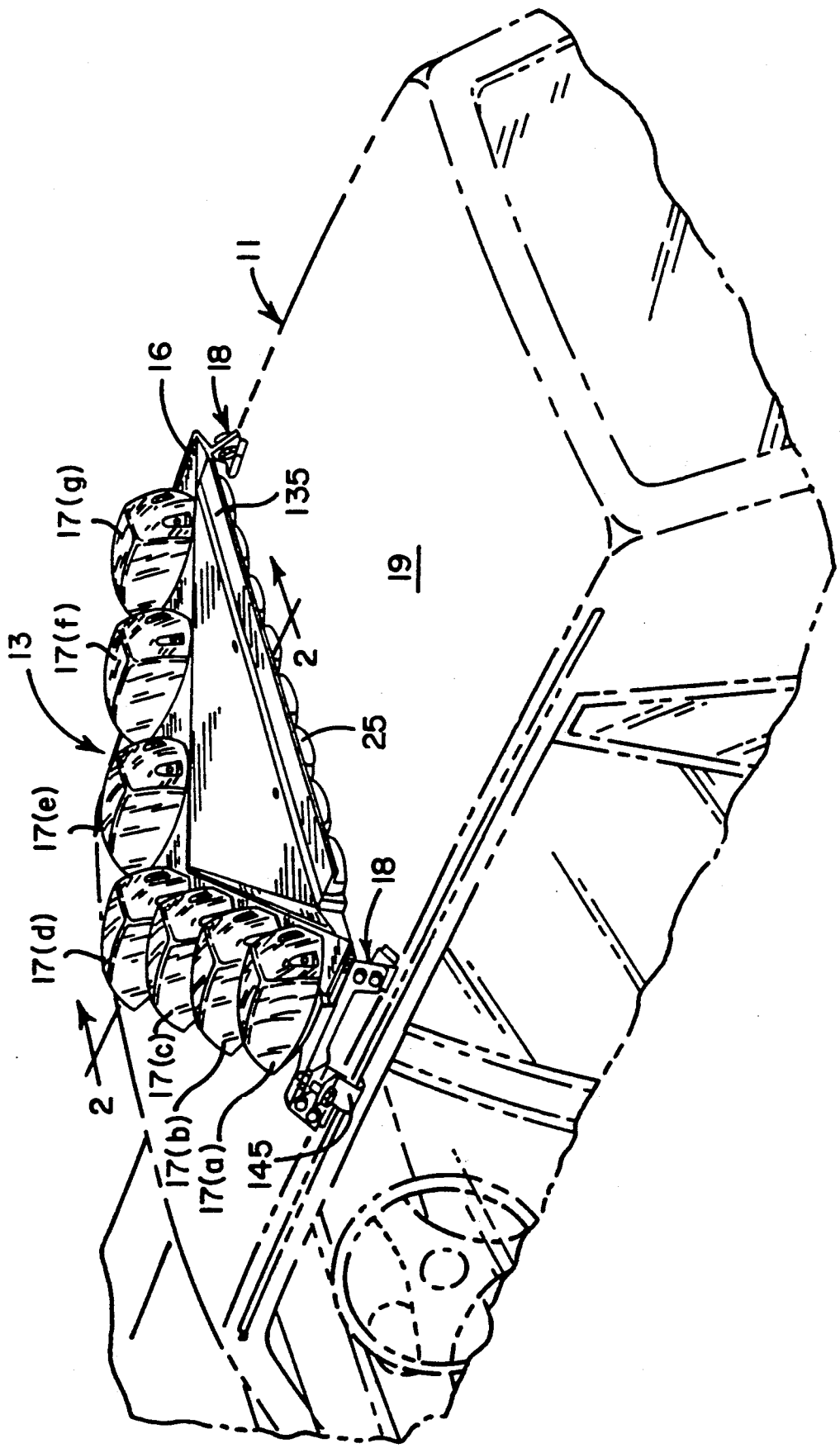
FIG. 1 is a perspective view of an emergency vehicle incorporating a light bar having a plurality of light modules mounted to a frame in accordance with the invention.
Figure 2:
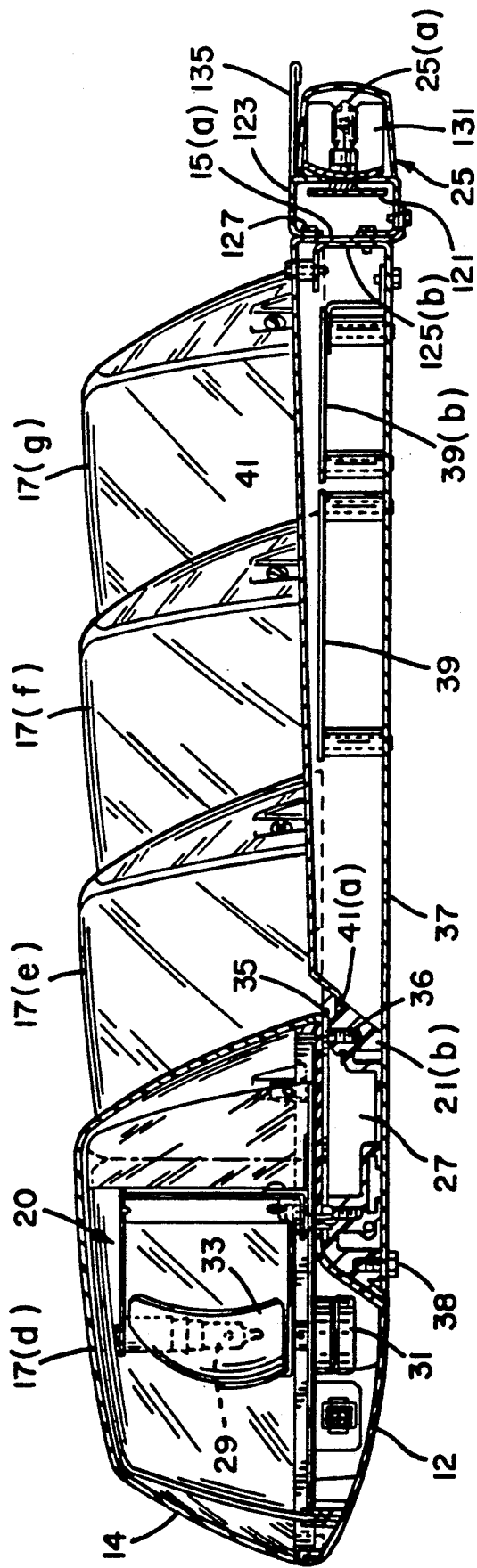
FIG. 2 is a cross-sectional view of the light bar taken along the line 2—2 of FIG. 1, showing a cross-sectional view of one of the light modules and the frame.

Turning to the drawings and referring first to FIGS. 1 and 2, an emergency signalling system according to a preferred embodiment of the invention is installed in an exemplary emergency vehicle 11 shown in broken lines. The system 13 includes a plurality of like modules 17(a)–17(g) housing signalling devices 20. The emergency signalling system 13 is mounted to a roof 19 of the vehicle 11, and the modules 17(a)–17(g) are evenly distributed across the roof.

Emergency signalling systems of the type mounted to the roof of emergency vehicles are commonly called "light bars" because they are typically shaped as a linear bar that traverses the roof. In keeping with this convention, the illustrated emergency signalling system is hereinafter referred to as a "light bar" since it is intended to be mounted to the roof of an emergency vehicle.

In the light bar 13, each of the signalling devices 20 is contained within one of the modules 17(a)–17(g). Each of the modules comprises a base section 12 and a dome 14 (as best see in FIG. 2) mounted to a frame 16 that traverses the vehicle. The frame 16 supports a housing 15 containing a portion of the circuitry for controlling the signalling devices 20 as will be explained more fully hereinafter. The light bar 13 is mounted to the vehicle 11 by way of a mounting assembly 18 at each end of the frame 16.

Because each of the signalling devices within the modules 17(a)–17(g) is identical to the other, a single reference number 20 will be used for each of the devices, although separate devices are housed in each one of the modules. In the illustrated light bar 13, space in the housing 15 is reserved for a portion of the circuitry that controls each of the signalling devices 20. The housing 15 is intended to provide an RF shield for the circuitry inside the light bar 13 since the vehicle 11 will most likely be exposed to considerable RF noise. For example, the vehicle 11 is typically equipped with a two-way radio (not shown) whose transmitter creates serious noise problems for the electronics in the light bar 13 and, therefore, requires the electronics to be adequately shielded. Of course, the housing 15 must also protect electronics from the elements. Techniques for electrically and physically sealing the housing 15 are well known in the art.

The frame 16 comprises two extruded members 21a–21b (see FIG. 9) that are secured to one another to form a V-shaped base. Each of the members 21a and 21b forms one wing of the V and meet at a vertex 23 formed by the two wings of the V. The housing 15 for the circuitry controlling the signalling devices 20 spans the members 21a and 21b and also provides a base for supporting a row of secondary lights 25 distributed across the back of the light bar.

Each of the extruded members 21a and 21b is of identical cross section and formed from aluminum by a conventional extrusion process to define a channel 27, best seen in FIG. 2, for communicating wiring emanating from the circuitry in the housing 15 to the signalling devices 20, each of which comprises a lamp 29 and a stepper motor 31 mounted in the base section 12 of each module 17(a)-17(g) for rotating a reflector 33. For ease of assembly and wiring of the light bar 13, the channel 27 opens at the top of each member 21a and 21b. After the wiring has been placed in the channel 27, a top plate 35 made of aluminum is received by a recess in the members 21a and 21b and secured by threaded screws 36 in order to close the channel and isolate it from the elements of the ambient environment. The top plate 35 includes a variety of holes (see FIG. 8) for securing the modules 17(a)-17(g) to the frame 16 and for communicating wiring from the channel 27 to the signalling devices 20 as explained more fully hereinafter.

In order to form the housing 15 and secure it to the extruded members 21a and 21b, a bottom pan 37 is secured by threaded screws 38 to the bottom side of each extruded member 21a and 21b and extends rearwardly past the member. The bottom pan 37 is made of aluminum and has the general shape of a triangle in order to fit within the V-shape formed by the two extruded member 21a and 21b. Circuit board assemblies 39a and 39b are mounted on the bottom pan 37 and preferably provide programmable circuitry (e.g., microprocessor-based circuitry) for controlling the stepper motor 31 and lamp 29 of each signalling device 20 in conjunction with additional circuitry (not shown) contained within the vehicle 11. A control system that may be used in conjunction with the illustrated light bar 13 is disclosed in co-pending U.S. application number (Atty. Docket No. 32262), assigned to the same assignee as that of the present invention. In this regard, any type of light radiating device (e.g., a strobe) may be substituted for the illustrated stepper motor 31 and incandescent lamp 29 since it is the relative positioning of the signalling devices 20 rather than their composition that is important to this invention. Nevertheless, applicants prefer the use of the illustrated stepper motor 31 for directly driving the rotation of the reflector 33 about its focal point. Because the stepper motor 31 moves in response to discrete pulses, it is particularly suitable for use with the microprocessor-based control system disclosed in the aforementioned co-pending application.

In order to complete the housing 15 and isolate the circuitry 39a and 39b contained within it from the elements of the ambient environment, a top pan 41 formed of aluminum is received by the extruded members 21a and 21b and the bottom pan 37. As best seen in FIG. 2, the top pan 41 includes a flange 41a that is received by a mating slot in the extruded members 21a and 21b in order to join the top pan to the members. When considered from the area of the flange 41a backward, the cross section of the housing 15 flares as best seen in FIG. 2. The flare provides a sufficient vertical back portion 15a of the housing 15 for mounting the row of secondary lights 25 while minimizing the leading profile of the housing so as to reduce wind resistance as much as possible.

In accordance with one important aspect of the invention, the signalling devices 20 are distributed along the frame 16 to form a non-linear pattern that maintains a distributed light pattern when viewed at angles to the heading of the vehicle 11 up to and including 90°, thereby enhancing the ability of the light bar 13 to attract attention when viewed at severe angles to the heading of the vehicle. To facilitate the maintenance of the distributed light pattern at angles to the heading of the vehicle 11, the dome assembly for covering the signalling devices 20 (e.g., the domes 14 of the modules in the illustrated embodiment) also forms a non-linear pattern that traverses the vehicle. Preferably, the non-linear pattern formed by the dome assembly is the same as that formed by the signalling devices. In the illustrated and preferred embodiment, the pattern is V-shaped. It will be appreciated by those skilled in the art of designing light bars for vehicles, however, that other shapes may also be used for the non-linear pattern. For example, the pattern may be U-shaped or O-shaped. Some of the signalling devices 20 could be aligned across the roof so that only a few create the non-linear pattern. The important consideration in selecting a shape of the pattern is that it provides for a distribution of the signalling devices 20 along the heading of the vehicle 11 so that a distributed light pattern is seen when the vehicle is viewed from an angle.

In the illustrated and preferred embodiment, the dome assembly comprises the domes 14 of the plurality of modules 17(a)-17(g), where each dome covers only one signalling device 20. As an alternative embodiment, the dome assembly may be a continuous canopy that covers more than one of the signalling devices 20. An example of such an alternative embodiment illustrated in FIG. 13, which is discussed in greater detail hereinafter.

Figure 3A:
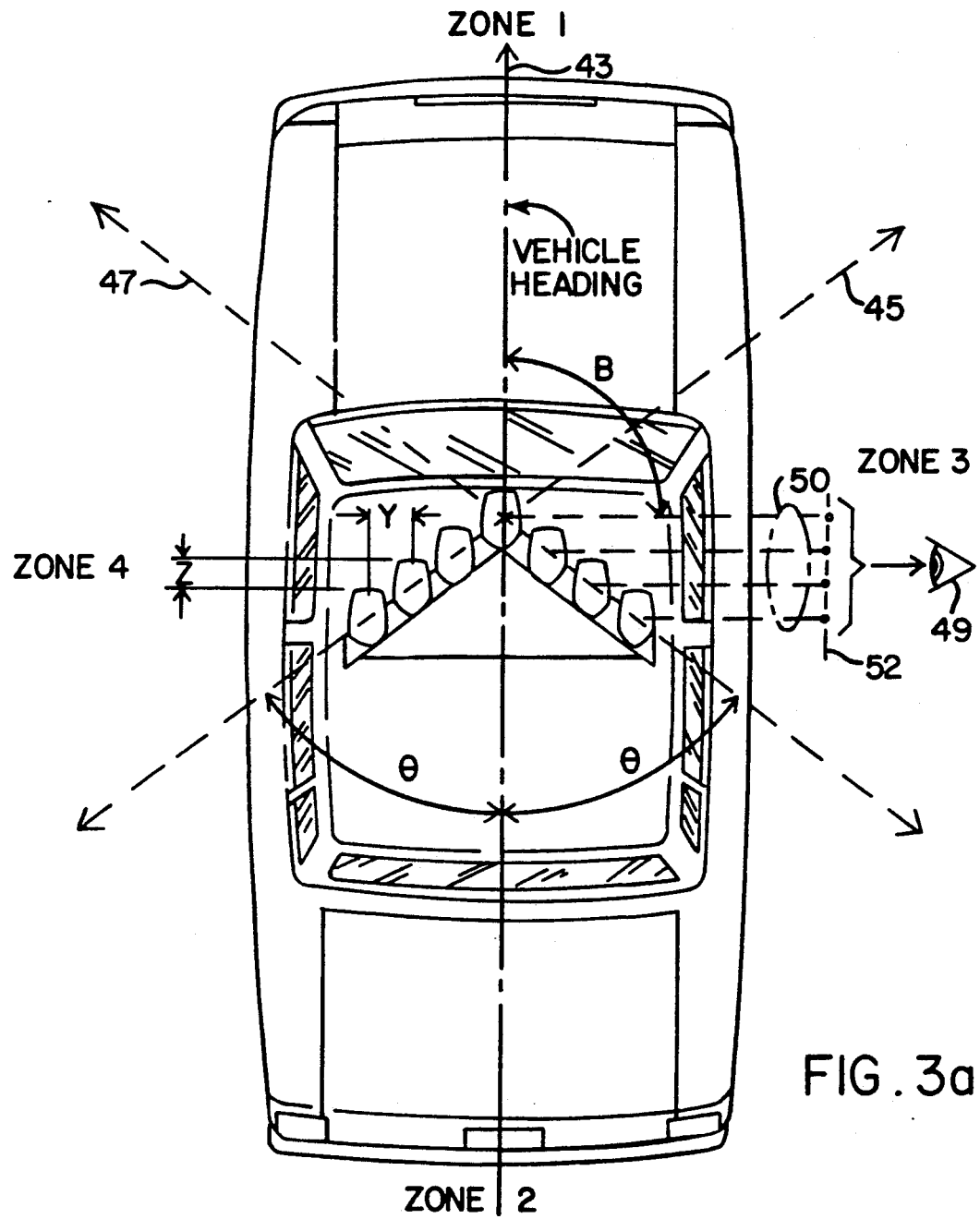
FIG. 3a is a schematic plan view of the light bar mounted on a vehicle illustrating the improved visibility provided by the light bar for an observer positioned at an angle to the line of travel of the emergency vehicle and also illustrating the ability of the light bar to directionalize its warning pattern into zones.

Referring to FIG. 3a, the non-linear pattern of the illustrated light bar 13 is symmetrical about a plane 43 that is orthogonal to the drawing and parallel to the heading of the vehicle 11. Each of the modules 17(a)-17(g) and its associated signalling device 20 are offset in the direction of the vehicle heading on either side of the plane 43 by a distance Z with respect to an adjacent module. In a direction traversing the heading of the vehicle 11, each module 17(a)-17(g) is offset from an adjacent module by a distance Y. Because each of the offsets for one of the modules 17(a)-17(g) is substantially equal in magnitude to the similar offset of the other modules, the resulting pattern is the illustrated V-shape. If the offsets vary in magnitude, patterns of other shapes result. Preferably, the ones of the modules 17(a)-17(g) on each side of the plane 43 define a wing of the V-shaped pattern whose angle $\theta$ with respect to the heading of the vehicle is approximately equal to 45°.

Extending the wings formed by the modules 17(a)-17(g) on each side of the plane 43 by drawing a dashed line 45 and 47 past the end modules in each wing as illustrated divides the area around the vehicle 11 into four (4) quadrants or zones 1, 2, 3 and 4. By selectively operating the lamp 29 and reflector 33 of individual ones of the signalling devices 20, the visual pattern collectively generated by the devices may be directionalized into any one of these four zones. For example, by operating only the signalling devices 20 on the left-hand side of the plane, the visual pattern can be directed primarily into zone 4. Similarly, by operating only the signalling devices 20 on the right-hand side of the plane, the visual pattern can be directed primarily into zone 3.

Operating all of the signalling devices 20 distributes the visual pattern among all four zones. By controlling the rotation of the reflectors 33, the visual pattern generated by the signalling devices 20 can be directed into either zone 1 or zone 2 or simultaneously into zones 1 and 2.

An observer 49 positioned at an angle $\beta$ with respect to the heading of the vehicle sees a distributed light pattern well beyond the angle 90°. As can be seen in FIG. 3a, the beams of light from the signalling devices 20 remain visually discrete to the observer 49 who is viewing the vehicle 11 at an angle $\beta$ close to 90° from the heading. The greatest enhancement in the visibility of the visual pattern provided by the non-linear shape of the light bar occurs at angles $\beta$ greater than 45°. At an angle $\beta$ of approximately 45°, an observer sees a distribution of light that is approximately the same visual distribution offered by a conventional linear light bar. As the angle of the observer increases past 45°, the distribution of light in a linear light bar quickly shrinks and the beams blend and eventually are reduced to virtually a single beam width at 90°. In contrast to this rapid reduction in visibility, the non-linear light bar of the invention maintains a distributed pattern of light beams well past an angle $\beta$ equal to 90° as indicated by the projection of the light beams 50 onto a plane 52 in FIG. 3a. In essence, the non-linear light bar of the invention increases the visibility of the light patterns in zones 3 and 4 illustrated in FIG. 3a while maintaining the same degree of visibility provided by conventional linear light bars in zones 1 and 2.

Figure 3B:
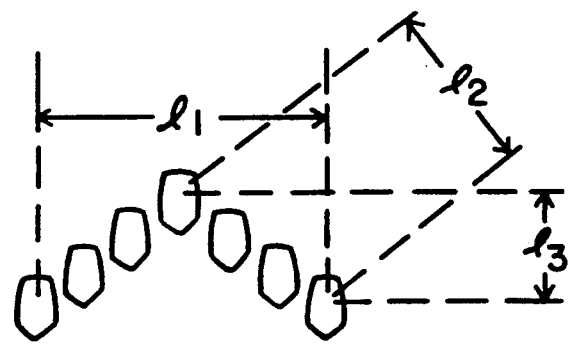
FIG. 3b is a schematic plan view of the pattern formed by the modules, illustrating the ability of the modules to maintain a reasonably wide distribution of light even when viewed 90° from the heading of the vehicle.

Referring briefly to FIG. 3b, the distribution of light beams from the modules 17(a)–17(g) is viewed by an observer in the center of zone 1 to provide a distribution of approximately the length $l_1$. As the observer moves away from the vehicle heading and toward zone 3, the distribution decreases. At an angle $\beta$ of 45°, the visual distribution is across a length $l_2$, which is equal to $l_1/\sqrt{2}$. As the observer moves into zone 3 and toward an angle $\beta$ of 90°, the visual distribution decreases to a length $l_3$, which is equal to $l_1/2$. By maintaining a substantial effective distribution of the signalling devices at all angles of view, the light bar 13 is significantly more visible at angles approaching 90°.

By providing the domed modules 17(a)–17(g) for every signalling device 20 in the preferred embodiment, overall transmittance is enhanced at angles $\beta$ to the heading of the vehicle 11, thereby further increasing the visibility of the light pattern provided by the non-linear distribution of the signalling devices. In conventional linear light bars, the angle of incidence $\phi$ for a beam of light emanating from a signalling device 20 approaches 90° when the beam is viewed from the side of the vehicle. As indicated in FIG. 4a, the angle of incidence is conventionally measured from a reference that is perpendicular to the incident surface. As is well known, as the angle of incidence $\phi$ increases, the transmittance of light decreases. In the exemplary graph of FIG. 4a, it can be seen that the value of transmittance typically stays quite high (e.g., 90%) until the angle $\phi$ exceeds some critical angle X. At angles greater than the critical angle X, the transmittance quickly deteriorates until it reaches zero at an angle $\phi$ equal to 90°.

In a conventional linear light bar, at least some of the light beams from the signalling devices 20 would be transmitted through the dome of the bar at angles greater than the critical angle X when viewed from the side of the vehicle 11. In contrast, the substantially teardropshaped modules 17(a)–17(g) of the illustrated embodiment of the invention each provide a dome 14 surrounding and protecting one of the signalling devices 20 such that the angle of incidence remains less than the critical angle X for full rotations of the light beams formed by the devices. Regarding the enhanced transmittance provided by the domes of the modules 17(a)–17(g), FIG. 4b illustrates in a schematic manner the angle of incidents for several beams of light emanating from one of the signalling devices 20. For beams 51 and 53 directed along the heading of the vehicle 11, the angle of incidence $\phi$ is approximately 0°, thus maximum transmittance is provided. As the beam sweeps through a 360° rotation in response to rotation of the reflector 33, the angle of incidence varies as illustrated by the six beams 55–60. The three beams 55–57 are the mirror images of the three beams 58–60 with respect to the plane of symmetry 61 of the dome 14 illustrated in FIG. 4b. The three angles of incidents for the six beams are $\phi_1$, $\phi_2$ and $\phi_3$ of which all are less than the critical angle X.

Figure 5A:
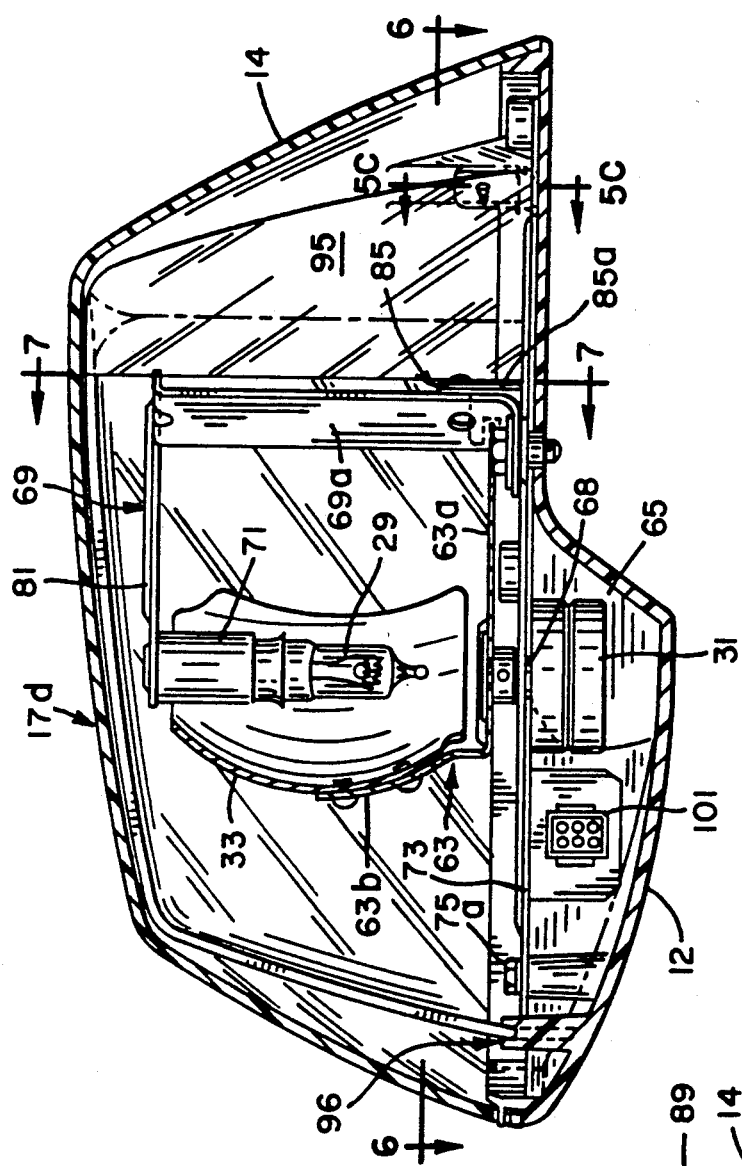
FIG. 5a is an enlarged view of the cross-section of the light module in FIG. 2 more clearly illustrating the two major subassemblies of the module—i.e., a base section and a dome.
Figure 5B:
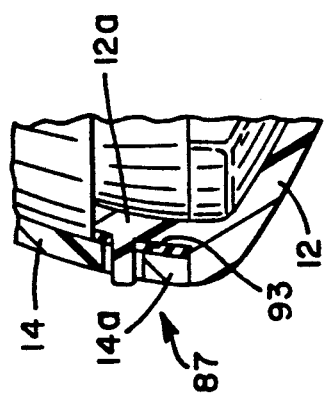
FIG. 5b is an enlarged partial view of the light module in FIG. 5a, illustrating a tongue-and-slot assembly for securing the base section of the module to a front portion of the dome.
Figure 5C:
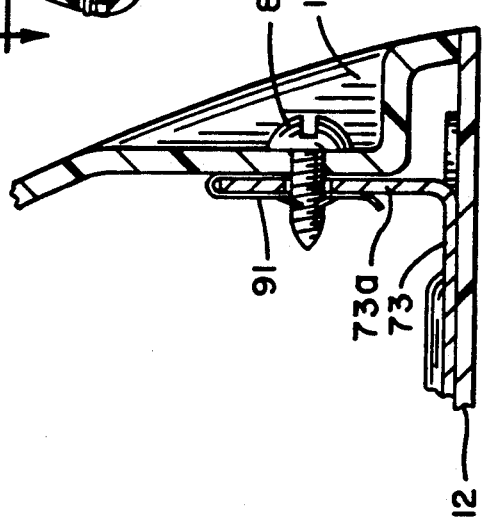
FIG. 5c is an enlarged partial view of the light module in FIG. 5a, illustrating a threaded screw assembly for securing the base section of the module to a back portion of the dome.
Figure 6:
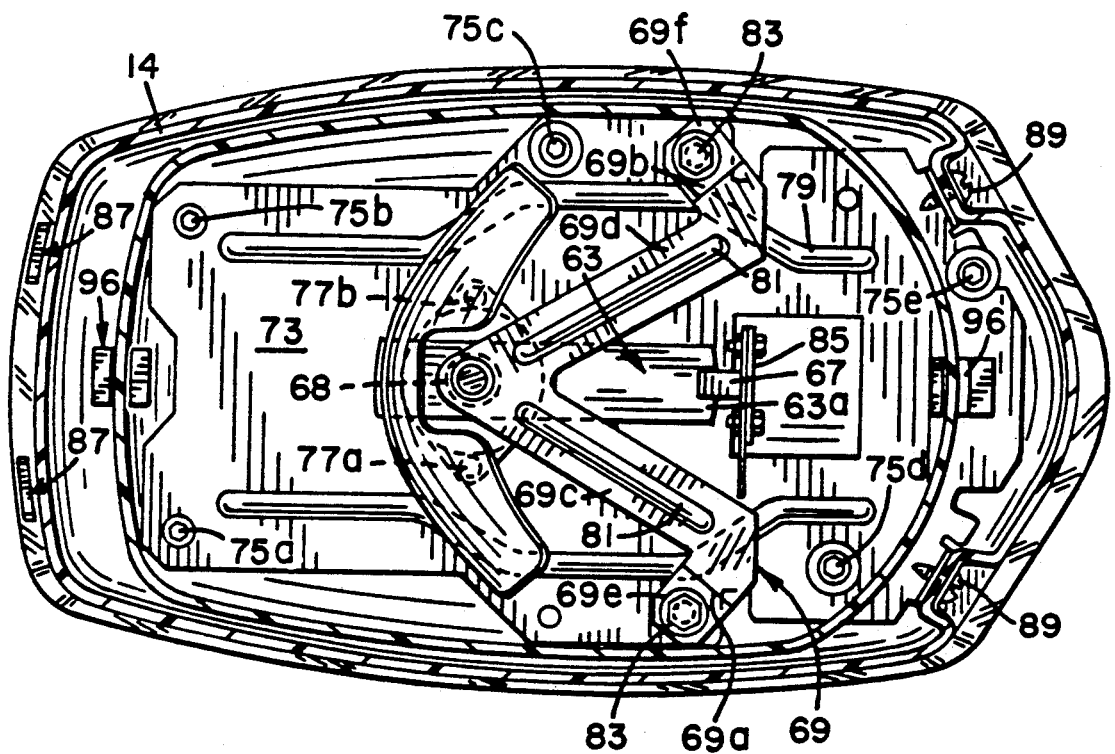
FIG. 6 is a plan view of the light module in FIG. 5a taken along the line 6—6.
Figure 7:
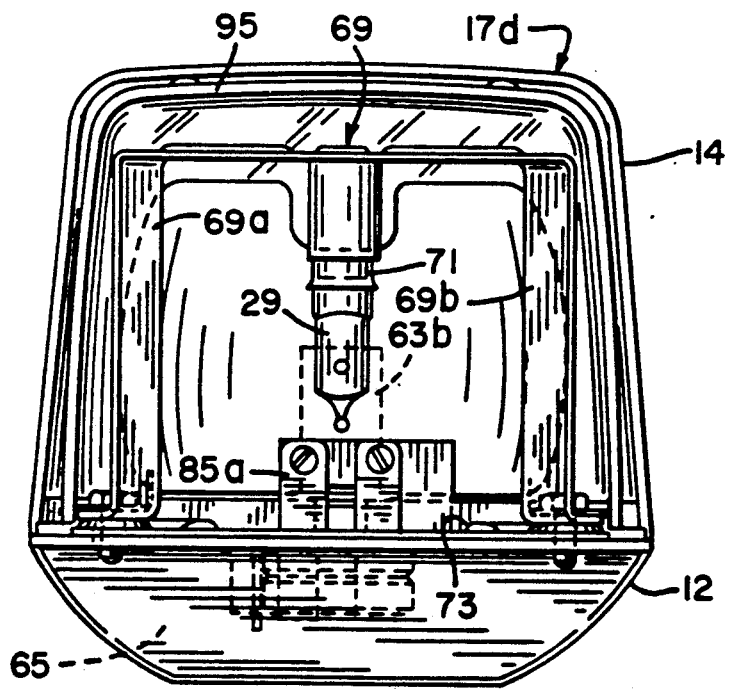
FIG. 7 is a cross-sectional view of the light module in FIG. 6 taken along the line 7—7.

Referring now to the structure of the signalling devices 20 and their modules 17(a)–17(g), FIGS. 5–7 illustrate the detailed construction of an exemplary one of the signalling devices 20 in the module 17(d) illustrated in FIG. 2. As previously indicated, each of the signalling devices 20 is identical to the others. Similarly, the modules 17(a)–17(g) are identical except for differences in their shape necessary to accommodate their mountings on different areas of the frame 16. Therefore, only the signalling device 20 of the module 17(d) will be discussed in detail hereinafter. As for the details of the construction of the modules 17(a)–17(g), the following discussion refers to the illustration of module 17(d) in FIGS. 5–7, but applies equally to all of the other modules as well.

The stepper motor 31 directly drives the mounting 63 for the reflector 33. In order to directly drive the reflector 33 and its mounting assembly 63, the motor 31 is mounted in a cavity 65 of the base section 12 of the module 17(d) such that the drive shaft 66 of the motor projects along a vertical axis through a hole 68 in the base section.

The mounting assembly 63 for the reflector 33 is fixed to the end of the drive shaft 66 so that the assembly and reflector rotate with the shaft. The shaft 66 of the stepper motor 31 rotates in arcuate steps and, because the mounting assembly 63 and reflector 33 are secured to the shaft, they also rotate in arcuate steps. The mounting assembly 63 extends horizontally in one direction to define an extension 63a that interacts with a position sensor 67 in order to provide a reference signal to the microprocessor-based circuitry 39a–39b for the rotation of the reflector 33 about the lamp 29. For the reflector 33 to orbit the lamp 29 as the shaft 66 of the stepper motor 31 rotates, the reflector is mounted to the mounting assembly 63 at a position that is offset from the vertical axis of rotation defined by the shaft. The amount of offset defines the radius of the orbit for the reflector 33 and positions the reflector so that its focal point is coincident with the position of the lamp 29. The direction and speed of the arcuate steps executed by the stepper motor 31, the mounting assembly 63 and the reflector 33 are controlled by a control system including the microprocessor-based circuitry 39a–39b in the housing 15 of the light bar.

The mounting assembly 63 for the reflector 33 is generally L-shaped as illustrated and formed from 0.040 inch thick C-1008 or C-1010 cold rolled steel. The reflector 33 is riveted to an upright arm 63b of the mounting assembly 63 so that the reflector is offset from the axis of rotation as previously mentioned. The reflector 33 is made of 3003 aluminum and has a conventional surface contour of a paraboloid. A finish is placed on the surface of the reflector 33 so that it has a beam of relatively intermediate width and sufficient candle intensity on and off the axis of the paraboloid such that both narrow and broad beam intensity requirements are met. To ensure sufficient beam width, the finish of the reflector is prepared using a conventional chemical dipping and anodizing process, commonly called "bright dipping." With a sufficiently broad beam width and bright light source for the lamp 29, the signalling device is able to meet the photometric requirements (e.g., SAE requirements) for all the patterns commonly made by different types of conventional rotators.

The lamp 29 is suspended above the axis of rotation for the reflector 33 by a lamp mounting assembly 69. The assembly 69 includes a conventional lamp socket 71 for receiving a 50 watt single contact, bayonet base, halogen lamp, which is the preferred light source. A 50 watt halogen light has sufficient intensity to satisfy on-axis photometric requirements for any pattern the signalling device may be asked to execute while complementing the beam width of the reflector 33 to also meet or exceed beam width photometric requirements for any pattern. Also, a 50 watt halogen lamp for each of the signalling devices 20 is a practical power level that can be supported by the electrical system of the vehicle 11, assuming that the number of signalling devices in a light bar is not excessive.

In each of the modules 17(a)-17(g) of the seven signalling devices 20, a plate 73 in the base section 12 provides structural support for mounting the devices. The plate 73 in turn is secured to the base section 12 by five (5) screws 75a-75e. The stepper motor 31 is mounted to the underside of the plate 73 by two screws 77a and 77b and its shaft projects through the hole 68 in the plate. As an aid in providing structural support, the plate 73 is stamped to include raised ribs 79 best seen in FIG. 6.

To support the lamp 29 and lamp socket 71 above and along the axis of rotation and focal point of the reflector 33, the lamp mounting 69 includes a one-piece frame comprising two legs 69a and 69b, each supporting a cantilevered arm 69c and 69d that is joined at its end to the other arm. The joint formed by the mating of these two arms 69c and 69d secures the lamp socket 71 over the axis of rotation. To provide added structural strength, the arms include raised ribs 81. The mounting assembly 69 is formed from 0.059 inch thick 1008 or 1010 cold rolled steel The legs 69a and 69b are oriented so as to present a minimum profile to the light radiating from the lamp 28. Each of the legs 69a and 69b includes a foot 69e and 69f, respectively, for securing the mounting 69 to the plate 73 of the module. Each foot 69e and 69f is secured to the plate 73 by way of an expanding nylon fastener and screw combination 83. The nylon fastener allows the assembly 69 to be electrically common with the lamp socket 71 in that the fasteners electrically insulate the assembly from the plate 73. As explained in connection with FIG. 4, the lamp 29 is energized by grounding the socket 71 and assembly 69.

The position sensor 67 is mounted to a tab 85 that is a vertically bent portion of the plate 73. Two screws hold the sensor 67 to a vertical face 85a of the bracket 85 so that the extension 63a of the reflector mounting 63 passes through a gap in the sensor 67 and breaks a light beam between a phototransistor and photodiode comprising the sensor.

Each of the modules 17(a)-17(g) of the light bar 13 includes the dome 14, which is made of transparent plastic material such as lens grade polycarbonate plastic. To form one of the modules 17(a)-17(g), the dome 14 is secured to the front of the base section 12 by way of a tongue-and-slot arrangement 87 as best seen in FIG. 5b and secured at the back of the base by a pair of screws 89 as best seen in FIG. 5c. Tinnerman clips 91 cooperate with the screws 89 to fasten the dome 14 to the base section 12 by way of a vertical extension 73a of the plate 73. With the domes 14 in place, the signalling devices 20 are isolated from the elements of the ambient environment. A gasket 93 is fitted between a wall 12a of the base section and the rim 14a of the dome 14 in order to seal the junction between the two. Preferably, the gasket 93 need only extend about the front portion of each module since it is this area where high pressure caused by the movement of the vehicle 11 could create a leak without the addition of the gasket. Under each of the domes 14, a color filter 5 may be provided. These filters 95 fit into slots formed by two pairs of opposing ribs 96 best seen in FIGS. a and 6. The filters 95 are preferably each in front and back sections so that different colors can be projected into different zones if desired.

Figure 8:
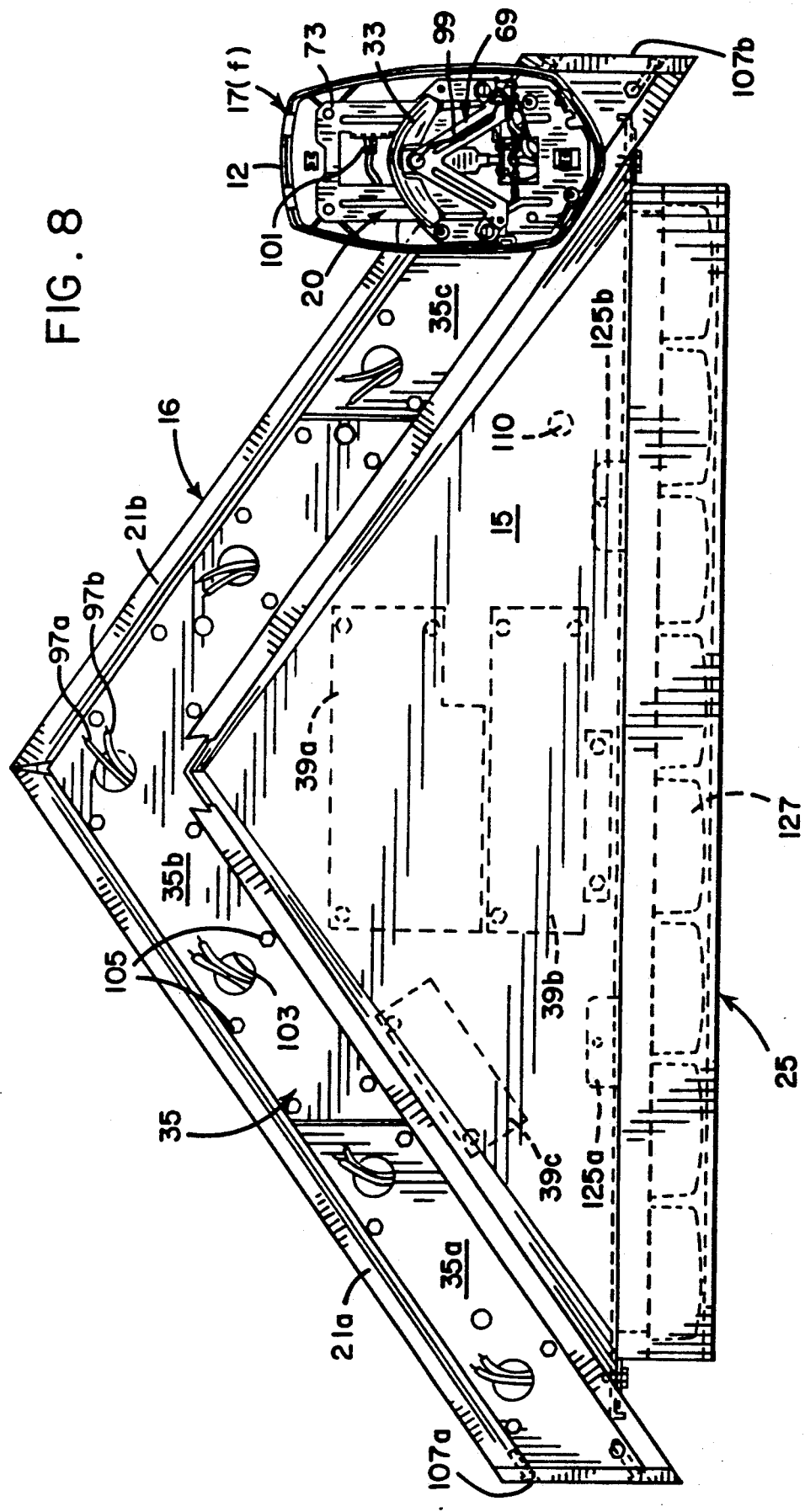
FIG. 8 is a plan view of the light bar with all but one of the modules removed in order to more clearly illustrate the structure of the frame.

A pair of cables 97a and 97b from the microprocessor based circuitry 39a-39b in the housing 15 of the light bar 13 feeds wires to the motor 31 and lamp socket 71 of each signalling device 20 via the channel 27 in the frame 16 as best seen in FIG. 8. Also, wires in one of the cables 97a and 97b carry signals from the position sensors 67 back to the microprocessor-based circuitry 39a-39b by way of the channel 27. A wire 99 to the socket 71 for the lamp 29 is secured to one of the legs 69a or 69b of the lamp mounting 69 and provides power to the positive terminal in the socket. In each of the modules, a connector 101 (FIGS. 5a and 8) mounted to the underside of the plate 73 interfaces the wiring of the signalling device 20 and the wiring from the microprocessor-based circuitry 39a-39b.

As can be best seen in FIG. 8, the top plate 35, which is fitted into a recess of the extruded members 21a and 21b, is preferably comprised of three sections 35a, 35b and 35c. Each of the sections 35a-c includes ports 103 for communicating the pair of the cables 97a and 97b from the channel 27 of the extruded members 21a and 21b to the modules 17(a)-17(g). One of the cables 97a and 97b includes a set of wires for controlling the motor 31, while the other cable controls the lamp 29 of the signalling device 20. In this regard, the module 17(g) is illustrated in FIG. 8 with its dome 14 removed in order to show the wiring from the port 103 into the signalling device 20. The ports communicate into the interior of the modules 17(a)-17(g) by way of holes in the base section 12 and the plates 73 that align with the ports when the modules are mounted to the frame 16. Holes such as 105 illustrated in FIG. 8 are also provided in the three sections 35a-c of the plate 35 in order to secure the base section 12 of each module 17(a)-17(g) to the frame 16. The extruded members 21a and 21b are capped at their end by face plates 107a and 107b.

Figure 9:
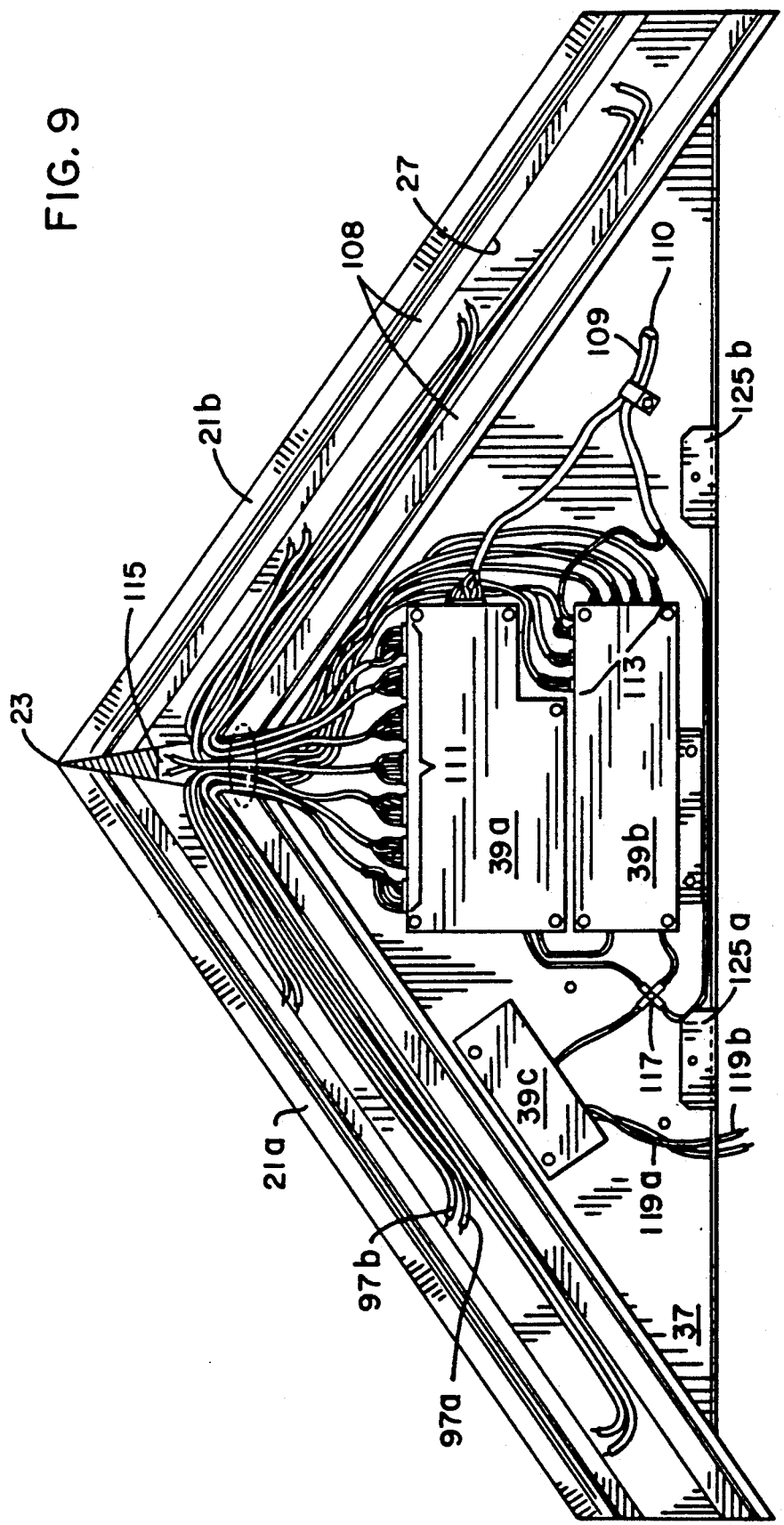
FIG. 9 is the same plan view of FIG. 8, except the cover for the electronics of the light bar and the plates for mounting the modules have been removed in order to expose the basic framework and wiring.

Removing the top plate 35 and cover 41 of the housing as shown in FIG. 9 exposes the recess 108 for receiving the plates 35 and the routing of the pairs of cables 97a and 97b for the seven (7) signalling devices 20 of the illustrated embodiment. Cabling 109 from the control system (not shown) for the light bar 13 communicates the control system with the microprocessor-based circuitry 39a-39b by way of a hole 110 in the pan 37. Sub-circuit 39a includes seven ports 111, each providing one of the cable 97a in the pair 97a and 97b going to one of the signalling devices 20. Each cable 97a from the subcircuit 39a controls the motor 31 of one of the signalling devices 20. Correspondingly, a sub-circuit 39b includes seven ports 113, each port being associated with the other cable 97b in one of the pairs. Each cable 97b from the sub-circuit 39b controls the lamp 29 of one of the signalling devices 20. All of the cables 97a and 97b are communicated into the channel 27 provided by each of the extruded members 21a and 21b by way of a gap 115 separating the two extruded members 21a and 21b. The gap 115 is tapered such that the two extruded members 21a and 21b meet at the vertex 23 of the tapered gap. A material made of closed cell neoprene rubber fills the tapered gap in the area beyond where the gap communicates to the channel 27.

Figure 10:
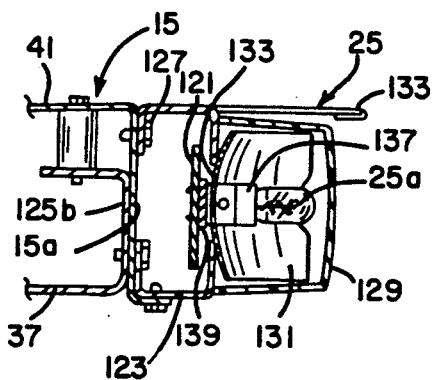
FIG. 10 is a partial and enlarged view of the cross-sectional view in FIG. 2, showing a back end of the frame and its connection to a series of lights mounted to the end.

A third sub-circuit 39c receives a portion of the cabling 109 from the control system by way of a junction connector 117. The sub-circuit 39c controls the operation of the assembly of secondary lights 25 by way of a pair of cables 119a and 119b that connect to a circuit board 121 for each light contained within a housing 123 as best illustrated in FIGS. 2 and 10. The pair of cables 119a-b from the sub-circuit 39c enter the housing 123 by way of a hole (not shown) in the top pan 41 of the housing 15. In order to secure the back of the top and bottom pans 41 and 37 of the housing 15, the bottom pan includes a pair of brackets 125a and 125b best seen in FIG. 9 taken in conjunction with FIG. 2. The brackets 125a and 125b are an extension of the aluminum that form the bottom pan 37. A spacer or standoff 126 is associated with each bracket 125a and 125b in order to provide the flared cross section of the housing 15 so that the back 15a of the housing has sufficient height for supporting the secondary lights 25. The assembly of secondary light 25 is attached to an L-shaped back portion 15a of the top cover 41 by way of a plurality of threaded screws 127 as best seen in FIG. 10.

The row of secondary lights 25 is, in the illustrated embodiment, a row of eight lamps 25a primarily intended for directing traffic approaching the vehicle 11 from behind. The row has eight (8) individual polycarbonate lens 129 and aluminum reflector sub-assemblies 131 attached to a channel 133 formed by the housing 123, which is also made of aluminum. Each lamp 25a, lens 129 and reflector assembly 131 form a light assembly that is secured to the housing 123 by two screws (not shown). The row arrangement of the secondary lights 25 allows them to flash in various patterns such as sequentially left to right or right to left. By sequencing the lamps 25a from one end to the other, the secondary lights 25 collectively function as an indicating arrow to direct vehicles to pass the emergency vehicle 11 on either its left or right side. An aluminum visor 135 surrounds the top and sides of the channel 133 and the light assemblies. This visor 135 is secured in place by mounting it between the top pan 41 of the housing 15 and the housing 123 of the secondary lights 25. The printed circuit boards 121 hold in place lamp sockets 137, and they snap into plastic standoffs 139 mounted inside the channel 133. A type GH22, bi-pin halogen lamps of 27 watts are preferably used in each light.

Figure 12:
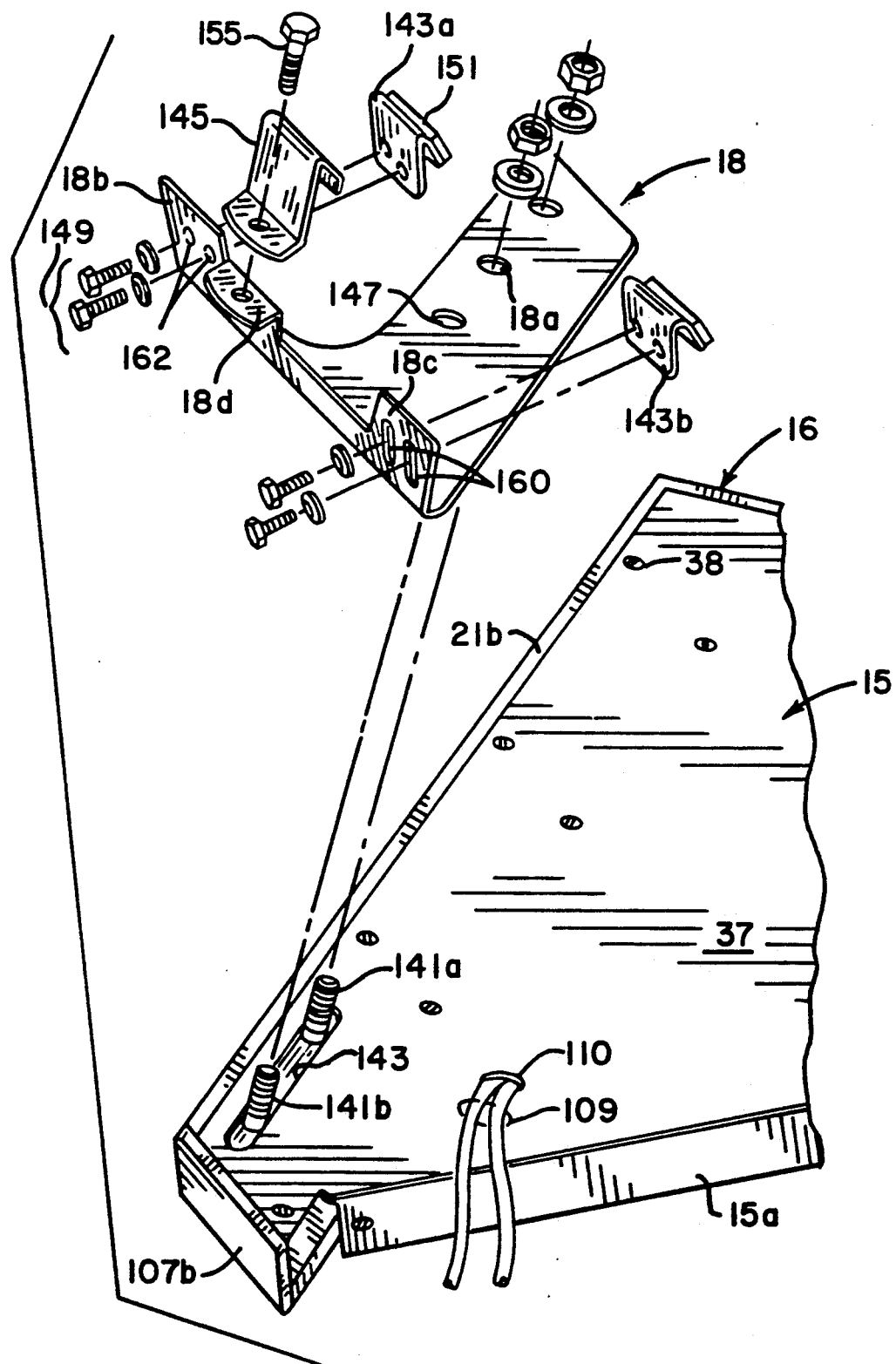
FIG. 12 is a partial perspective view of the underside of the light bar, with the components of the mounting assembly exploded in order to illustrate the composition of the assembly and its fastening to the frame of the light bar.

As best shown in FIG. 12, two (2) carriage bolts 141a and 141b that slide into the bottom of the extruded members 21a and 21b and protrude through a slot 143 in the bottom pan 37 of the housing 15 are used to secure each of the two mounting assemblies 18 to the light bar. Each of the mounting assemblies 18 are mirror images of the other and, therefore, only one will be described in detail hereinafter.

Figure 11:
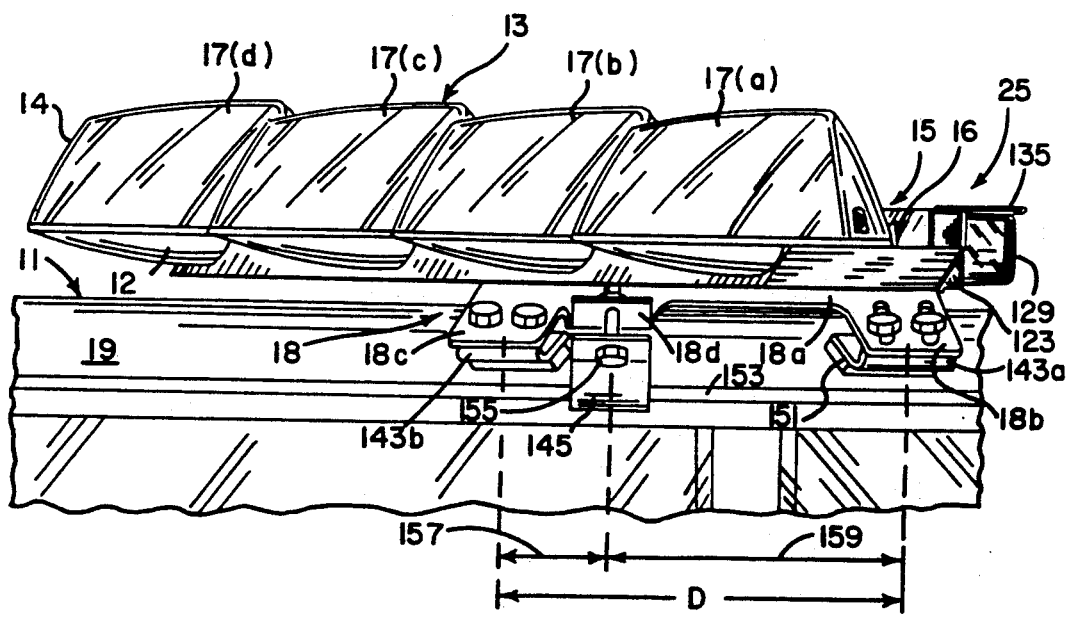
FIG. 11 is a side view of the light bar in FIG. 1 showing the mounting assembly for securing the light bar to the roof of the vehicle.

Each of the assemblies 18 consists of a main mounting bracket 18a made of cold-rolled steel. This bracket is configured so that the top of the bracket attaches to the carriage bolts 141a and 141b under the bottom pan 37. The side of the bracket 18a has outriggers 18b and 18c for attaching two separate mounting foot brackets 143a and 143b, as well as an outrigger 18d to support a mounting hook 145. When each of the mounting assemblies 18 is mounted to the light bar 13, the outrigger 18d is located approximately in line with the center of gravity of the light bar 13. In order to make the mounting assemblies 18 adaptable to various contours and widths of roofs, the main mounting bracket 18a includes an extra screw hole 147. The outriggers 18b and 18c each receive pairs of screws 149 that secure the foot brackets 143a and 143b. The foot brackets 143a and 143b are also made of cold-rolled steel. A rubber pad 151 snaps into the underside of each of the foot brackets 143a and 143b and is used to protect the vehicle 11 from scratches and dents. The mounting hook 145 is made of cold-rolled steel and secures the light bar 13 to the roof 19. One end of the hook 145 is secured under a rain gutter 153 of the vehicle 11 (FIG. 12) and the other end is secured to the outrigger 18d by way of a bolt 155 as best seen in FIG. 11.

The outrigger 18d and hook 145 are positioned to be in transverse alignment across the roof 19 of the vehicle 11 with the center of gravity of the light bar 13. Unlike conventional mounting assemblies for light bars, however, the foot brackets 143a and 143b are not evenly spaced from the outrigger 18d and hook 145 as can be best seen in FIG. 11. The foot brackets 143a and 143b are separated by a distance D in order to provide a sufficiently wide base for the mounting assembly 18 to be stable. The moment arm 157 about the outrigger 18d and hook 145 with reference to the forward foot bracket 143a is relatively short compared to the moment arm 159 about the outrigger and hook with reference to the rearward foot bracket 143b. The shorter moment arm 157 aids in ensuring the hook and its connection to the outrigger 18d is sufficiently strong to resist any rotational force resulting from currents of high velocity wind passing the light bar 13. Strong rotational forces about the outrigger 18d and hook 145 are much less likely to be generated along the moment arm 159 of the rearward foot bracket. Therefore, this bracket can be safely placed farther from the outrigger 18d and hook 145 in order to ensure the mounting assembly 18 has a sufficiently wide stance to be stable on the roof 19.

The mounting assemblies 18 at each end of the light bar 13 provide a highly rigid mounting for the light bar. The rigidity of the light bar 13 itself is aided by the housing 15 spanning the wings of the V-shaped frames 16. With a stable mounting and a rigid construction for the light bar, applicants have found that a center support for the light bar 13 is not necessary. Therefore, there is no need for holes to be drilled into the center of the roof 19 or other type of modifications made to the vehicle 11 in order to support the light bar 13 on the roof. In order to ensure the light bar 13 is leveled on the roof 11, the holes 160 in outrigger 18c are elongated so the position of the foot bracket 143b can be adjusted for the contours of different roofs. In contrast, the holes 162 in the outrigger 18b are not elongated.

Figure 13:
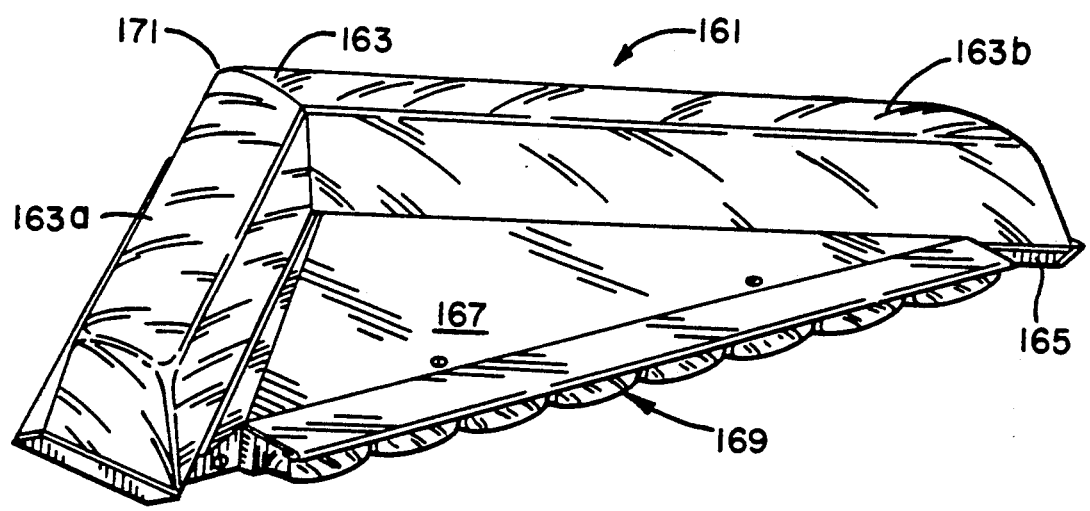
FIG. 13 is a perspective view of a light bar according to an alternative embodiment of the invention.

Finally, FIG. 13 illustrates an alternative embodiment of the invention wherein a light bar 161 according to the invention includes a dome 163 that forms a continuous closed canopy over the signalling devices (not shown) mounted to a V-shaped frame 165. As in the preferred embodiment, a housing 167 contains microprocessor-based circuitry for controlling the signalling devices and a row of secondary lights 169 mounted across the back of the housing 167.

The dome 163 may be formed of standard polycarbonate material and pieced together from two linear dome sections 163a and 163b that join at a vertex 171 of the V-shape. The interior of each dome section 163a and 163b provides a continuous cavity for mounting the signalling devices to the frame 165. The signalling devices may be of any conventional type, or they may be the signalling devices 20 shown in the preferred embodiment.

The light bar 161 of FIG. 13 provides essentially the same enhanced visibility when viewed at angles approaching 90° to the heading of the vehicle carrying the light bar as does the light bar 13 of the preferred embodiment. Because of the modular construction of the domes 14 of the light bar 13, however, the percentage transmittance of light at angles approaching 90° may be slightly less for the light bar 161 than for the light bar 13. Nevertheless, the light bar 161 still provides significantly improved visibility at severe angles to the heading of a vehicle relative to that provided by a conventional linear light bar.

From the foregoing, it will appreciated that the light bars 13 and 161 provide enhanced visibility relative to conventional linear light bars when viewed from an angle approaching 90° to the heading of the vehicles 11 to which the light bars are mounted. In the light bar 13, the modules 17(a)-17(g) for the signalling devices 20 provide high percentage transmittance of light radiating from the signalling devices at severe angles to the heading of the vehicle 11. Furthermore, the non-linear distribution of the signalling devices 20 allows for the devices to be controlled in a manner that can directionalize the warning signal generated by the signalling devices into different zones surrounding the vehicle. These advantages over conventional non-linear light bars are achieved without sacrificing visibility of the light bar along the heading of the vehicle 11. By providing a housing 15, the light bar incorporates programmable circuitry 39a-39b that advantageously utilizes the versatility offered by the use of a stepper motor 31 to drive the reflector 33 in the preferred signalling devices 20. In this regard, the ability of the light bar 13 to directionalize its warning signal is best realized by the signalling devices 20 driven by the programmable circuitry 39a-39b.

We claim:

1. A light bar for mounting to a roof of a vehicle and providing a signalling pattern whose primary warning effect can be alternatively directionalized into at least four distinct zones about the vehicle, the light bar comprising:
   a frame for traversing the roof of the vehicle;
   means at both ends of the frame for securing the frame to opposing edges of the roof;
   a plurality of signalling devices for radiating light distributed along the frame to form a non-linear pattern; and
   a dome assembly covering the signalling devices and mounted on the frame in such a manner that the assembly forms a non-linear pattern traversing the roof.

2. A light bar as set forth in claim 1 wherein the dome assembly comprises at least one continuous dome that contains two or more of the signalling devices.

3. A light bar as set forth in claim 1 wherein the dome assembly comprises a plurality of modules, each module covering only one of the signalling devices.

4. A light bar as set forth in claim 3 wherein the dome assembly is shaped to substantially maintain maximum transmittance of light emanating from the plurality of signalling devices for light propagating at any angle to a heading of the vehicle.

5. A light bar as set forth in claim 1 wherein the non-linear patterns formed by the signalling devices and the dome assembly are substantially the same.

6. A light bar as set forth in claim 1 wherein the non-linear pattern formed by the dome assembly is symmetrical about a plane that is parallel to a heading of the vehicle when the light bar is mounted t the vehicle.

7. A light bar as set forth in claim 6 wherein the non-linear pattern is approximately V-shaped.

8. A light bar as set forth in claim 4 wherein each of the modules comprises a base section for supporting the signalling devices on the frame and a transparent dome that provides a protective cover and mates with the base section in order for the module to surround and isolate the signalling device from the elements of the ambient environment.

9. A light bar as set forth in claim 8 wherein the transparent dome is secured to the base section for securing the dome to the base section by a tongue-and-slot arrangement on one side of the module and at least one threaded screw on the opposite side of the module for completing the securing of the dome to the base section.

10. A light bar as set forth in claim 1 wherein the frame includes means for housing microprocessor-based circuitry.

11. A light bar as set forth in claim 1 wherein the means for securing the frame to the roof includes first and second foot pads at each end of the frame for supporting the frame on the roof of the vehicle where a first axis passes through each of the first foot pads and a second axis passes through each of the second foot pads such that a moment arm about one of the axes is significantly greater than a moment arm about the other.

12. A light bar as set forth in claim 1 wherein the means for securing the frame on the roof of the vehicle includes means securing the frame to the roof only at the ends of the frame.

13. A light bar as set forth in claim 1 wherein at least one of the signalling devices includes a reflector and a lamp and means for rotating the reflector about the lamp such that the focal point of the reflector is coincident with the position of the lamp and the axis of the reflector's rotation.

14. A light bar as set forth in claim 13 including a mounting assembly for each of the lamps associated with the reflector wherein the mounting assembly includes means for supporting the lamp at the focal point of the reflector and suspended above the means for rotating the reflector.

15. A light bar as set forth in claim 14 wherein the means for supporting the lamp and suspending it above the means for rotating the reflector is oriented with respect to the lamp so as to present a minimum silhouette to the light waves reflected by the reflector.

16. A light bar for mounting to a roof of a vehicle comprising:
   a frame for traversing the roof of the vehicle;
   a plurality of signalling devices distributed along the frame to form a non-linear pattern that is symmetrical about a plane that is parallel to a heading of the vehicle when the light bar is mounted to the roof; and
   an assembly providing a protective cover for each of the signalling devices were at least one of the covers on each side of the plane are offset in that direction of the heading of the vehicle with respect to other covers on the same side of the plane.

17. A light bar as set forth in claim 16 wherein the non-linear pattern is a particular pattern that allows selective operation of the plurality of signalling devices to directionalize the visual effect provided by the plurality of signalling devices.

18. A light bar as set forth in claim 16 wherein the covers are a continuous dome on at least each side of the plane, which defines a continuous interior space shared by all of the plurality of signalling devices on the same side of the plane.

19. A light bar as set forth in claim 16 wherein the covers comprise a plurality of individual modules, with each module defining a confined interior space that contains and protects one of the plurality of signalling devices.

20. A light bar as set forth in claim 19 wherein each of the modules includes a base section for supporting the signalling device on the frame and a transparent dome that mates with the base section in order for the module to surround the signalling device and isolate it.

21. A light bar as set forth in claim 20 wherein the transparent dome is secured to the base section by a tongue-and-slot arrangement on one side of the module for securing the dome to the base section on one side of the module and at least one threaded screw on the opposite side of the module for completing the securing of the dome to the base section.

22. A light bar as set forth in claim 21 wherein each module includes means for mounting a color filter under the dome.

23. A light bar as set forth in claim 16 wherein the frame includes means for housing microprocessor-based circuitry.

24. A light bar as set forth in claim 16 including means at both ends of the frame for securing the frame to opposing edges of the roof.

25. A light bar as set forth in claim 24 wherein the means includes first and second foot pads for supporting the frame on the roof of the vehicle where the first foot pad is forward of the second foot pad when the light bar is mounted on the vehicle and the first foot pad is significantly closer to a transverse plane including the center of gravity of the light bar than the second foot pad.

26. A light bar as set forth in claim 25 wherein the means for supporting the frame on the roof of the vehicle includes a pair of the first and second foot pads and each of the two first and second foot pads is positioned at the end of the frame so that the light bar is supported on the roof only at its ends.

27. A light bar as set forth in claim 16 wherein the pattern formed by the signalling devices is V-shaped when viewed from above the bar and along the plane of symmetry.

28. A light bar as set forth in claim 16 wherein the pattern formed by the signalling devices is U-shaped when viewed from above the bar and along the plane of symmetry.

29. A light as set forth in claim 16 wherein the pattern formed by the signalling devices is O-shaped when viewed from above the bar and along the plane of symmetry.

30. A light bar for mounting to a vehicle comprising in combination:
   a continuous frame for traversing a roof of the vehicle;
   means at both ends of the frame for securing the frame to opposing edges of the roof;
   a plurality of signalling devices distributed substantially evenly along the frame to form a pattern that is symmetrical about a plane that is parallel to the heading of the vehicle when the light bar is mounted to the roof such that each signalling device on one side of the plane is offset relative to adjacent ones of the signalling devices in the direction of the heading of the vehicle;
   a dome assembly for protecting the signalling devices and transmitting light emanating from the signalling devices where a portion of the assembly that transmits light from one of the signalling devices in a direction transverse to the heading of the vehicle is offset in the transverse direction with respect to the similar portions of the assembly for the other signalling devices.

31. A light bar as set forth in claim 30 wherein the dome assembly forms a continuous housing for the signalling devices on at least one side of the plane.

32. A light bar as set forth in claim 30 wherein the dome assembly comprises a plurality of modules, each module surrounding one of the signalling devices and isolating it from the elements of the ambient environment.

33. A light bar as set forth in claim 32 wherein each of the modules includes a base section for supporting the signalling device on the frame and a transparent dome that mates with the base section in order for the module to surround the signalling device and isolate it.

34. A light bar as set forth in claim 33 wherein a tongue-and-slot arrangement secures the transparent dome to the base section on one side of the module and at least one threaded screw on the opposite side of the module completes the securing of the dome to the base section.

35. A light bar as set forth in claim 34 wherein each module includes means for mounting a color filter under the dome.

36. A light bar as set forth in claim 30 wherein the base includes means for housing microprocessor-based circuitry.

37. A light bar as set forth in claim 30 wherein the pattern formed by the signalling devices is substantially V-shaped.

38. A light bar as set forth in claim 37 including a row of lights mounted to the frame and spanning the V-shaped pattern from both ends of the pattern and facing rearwardly with respect to the vehicle when mounted to it.

39. A light bar as set forth in claim 30 including a row of lights mounted to the frame spanning the pattern of the lamps from both ends of the pattern and facing rearwardly with respect to the vehicle when mounted to it.

40. An emergency lighting system that includes a light bar for mounting to a roof of a vehicle and providing a signalling pattern whose primary warning effect can be alternatively directionalized into at least four distinct zones about the vehicle, the system comprising:
   a frame for the light bar mounted to the roof of the vehicle;
   a plurality of signalling devices for radiating light distributed along the frame to form a non-linear pattern such that more than two of the signalling devices are distinctly visible in each zone and at all positions within the zone; and
   a single electrical control system for controlling the operation of each of the plurality of signalling devices and for coordinating the operation of teach signalling device in order to generate signalling patterns employing some or all of the signalling devices.

41. An emergency lighting system as set forth in claim 40 including means at ends of the frame for securing the frame to opposing edges of the roof.

42. An emergency lighting system as set forth in claim 40 wherein each of the plurality of signalling devices comprises:
   at least one lamp for radiating light;
   a reflector having a focal point for reflecting light emanating from the lamp and collimating it into a beam;
   means for rotating the reflector about the focal point;
   a mounting assembly for the lamp that positions the lamp at the focal point and suspends it above the means for rotating the reflector; and
   the mounting assembly including members that interrupt the beam of light from the reflector, but are positioned with respect to the beam to present a minimum profile in order to minimize the interruption.

43. An emergency lighting system as set forth in claim 40 wherein at least part of the single electrical control system is contained within a housing incorporated into the light bar.

44. An emergency lighting system as set forth in claim 40 wherein the non-linear pattern is approximately V-shaped.

* * * * *